United States Patent
Seger et al.

(10) Patent No.: US 10,027,709 B2
(45) Date of Patent: *Jul. 17, 2018

(54) GENERATING A HONEY NETWORK CONFIGURATION TO EMULATE A TARGET NETWORK ENVIRONMENT

(71) Applicant: Palo Alto Networks, Inc., Santa Clara, CA (US)

(72) Inventors: Robert A. Seger, San Jose, CA (US); John Harrison, Sunnyvale, CA (US)

(73) Assignee: Palo Alto Networks, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/628,450

(22) Filed: Jun. 20, 2017

(65) Prior Publication Data

US 2017/0324776 A1 Nov. 9, 2017

Related U.S. Application Data

(63) Continuation of application No. 14/805,406, filed on Jul. 21, 2015, now Pat. No. 9,716,727.

(Continued)

(51) Int. Cl.
*G06F 11/00* (2006.01)
*H04L 29/06* (2006.01)

(52) U.S. Cl.
CPC ............... *H04L 63/1491* (2013.01)

(58) Field of Classification Search
CPC .... G06F 2009/45562; G06F 8/20; G06F 8/65; G06F 8/71; G06F 9/4401; G06F 9/44505; G06F 9/45533; G06F 9/45558; H04L 63/0245; H04L 63/1491; H04L 63/20; H04L 67/1095; H04L 2463/146;

(Continued)

(56) References Cited

U.S. PATENT DOCUMENTS 5,623,600 A 4/1997 Ji
5,842,002 A 11/1998 Schnurer (Continued)

FOREIGN PATENT DOCUMENTS

WO WO-2008054952 5/2008
WO WO-2012092251 7/2012

(Continued)

OTHER PUBLICATIONS

Christopher Hecker, ("Automated Honeynet Deployment for Dynamic Network Environment", IEEE, Jan. 7-10, 2013, 2013 46th Hawaii International Conference on System Sciences, pp. 4880-4889.*

(Continued)

*Primary Examiner* — Abiy Getachew
(74) *Attorney, Agent, or Firm* — Van Pelt, Yi & James LLP

(57) ABSTRACT

Techniques for generating a honey network configuration to emulate a target network environment are disclosed. In some embodiments, techniques for generating a honey network configuration to emulate a target network include receiving a network scan survey of the target network; generating the honey network configuration to emulate the target network using the network scan survey of the target network; and executing a honey network using the honey network configuration.

21 Claims, 7 Drawing Sheets

Related U.S. Application Data

(60) Provisional application No. 62/057,965, filed on Sep. 30, 2014.

(58) Field of Classification Search
CPC ............. H04L 63/0236; H04L 63/1416; H04L 63/145; H04L 67/02; H04L 41/06; H04L 41/0896; H04L 43/08; H04L 43/10; H04L 63/1425; H04L 63/302; H04L 63/308
See application file for complete search history.

(56) References Cited

U.S. PATENT DOCUMENTS

| | | | |
|---|---|---|---|
| 6,357,008 | B1 | 3/2002 | Nachenberg |
| 6,775,780 | B1 | 8/2004 | Muttik |
| 7,370,360 | B2 | 5/2008 | Van Der Made |
| 7,409,719 | B2 | 8/2008 | Armstrong |
| 7,664,626 | B1 | 2/2010 | Ferrie |
| 8,060,074 | B2 | 11/2011 | Danford |
| 8,151,352 | B1 | 4/2012 | Novitchi |
| 8,341,749 | B2 | 12/2012 | Rogel |
| 8,365,297 | B1 | 1/2013 | Parshin |
| 8,370,932 | B2 | 2/2013 | Adams |
| 8,473,931 | B2 | 6/2013 | Wu |
| 8,555,386 | B1 | 10/2013 | Belov |
| 8,813,226 | B2 | 8/2014 | Chung |
| 8,832,836 | B2 | 9/2014 | Thomas |
| 2012/0290848 | A1* | 11/2012 | Wang ...................... G06F 9/455 713/188 |
| 2012/0304244 | A1 | 11/2012 | Xie |
| 2014/0096229 | A1* | 4/2014 | Burns ................. H04L 63/1491 726/15 |
| 2014/0245444 | A1 | 8/2014 | Lutas |

FOREIGN PATENT DOCUMENTS

| | | |
|---|---|---|
| WO | WO-2012092252 | 7/2012 |
| WO | WO-2013067505 | 5/2013 |
| WO | WO-2013067508 | 5/2013 |

OTHER PUBLICATIONS

Author Unknown, The Honeywell Project, Know Your Enemy: Learning about Security Threats, Second Edition, Addison Wesley, 2004.
Baecher et al., The Nepenthes Platform: An Efficient Approach to Collect Malware, RAID 2006, LNCS 4219, pp. 165-184, 2006.
Blasing et al., An Android Application Sandbox System for Suspicious Software Detection, Malicious and Unwanted Software (MALWARE), 2010 5th International Conferences on IEEE, 2010.
Chen et al., Towards an Understanding of Anti-Virtualization and Anti-Debugging Behavior in Modern Malware, 2008.
Christopher Hecker, Automated Honeynet Deployment for Dynamic Network Environment, IEEE, Jan. 7-10, 2013, 46th Hawaii International Conference on System Sciences, pp. 4880-4889.
Garfinkel et al., Compatibility is Not Transparency: VMM Detection Myths and Realities, Mar. 2, 2014.
Jiang et al., Stealthy Malware Detection Through VMM-Based "Out-of-the-Box" Semantic View Reconstruction, 2007.
King et al., SubVirt: Implementing Malware with Virtual Machines, 2006.
Provos et al., Virtual Honeypots: From Botnet Tracking to Intrusion Detection, Pearson Education, 2007.
Roger A. Grimes, Honeypots for Windows, Apress, 2005.
Yin et al., Panorama: Capturing System-Wide Information Flow for Malware Detection and Analysis, Carnegie Mellon University, Research Showcase @CMU, Department of Electrical and Computer Engineering, 2007.

\* cited by examiner

GENERATING A HONEY NETWORK CONFIGURATION TO EMULATE A TARGET NETWORK ENVIRONMENT

CROSS REFERENCE TO OTHER APPLICATIONS

This application is a continuation of co-pending U.S. patent application Ser. No. 14/805,406, entitled GENERATING A HONEY NETWORK CONFIGURATION TO EMULATE A TARGET NETWORK ENVIRONMENT, filed Jul. 21, 2015, which claims priority to U.S. Provisional Patent Application No. 62/057,965, entitled GENERATING A HONEY NETWORK CONFIGURATION TO EMULATE A TARGET NETWORK ENVIRONMENT, filed Sep. 30, 2014, both of which are incorporated herein by reference for all purposes.

BACKGROUND OF THE INVENTION

A computer network audit can be performed using a manual and/or an automated approach to collect information about devices (e.g., hosts, network devices, etc.) and services associated with a computer network. For example, manual computer network audits can include performing security vulnerability scans, reviewing application and operating system versions and access controls, and determining physical access to the systems. Automated computer network audits can include system generated audit reports or using software to monitor and report changes to files and settings on devices on the computer network. Example devices can include personal computers, laptops, mobile devices (e.g., tablets, mobile phones, and/or other mobile devices), servers, appliances, mainframes, network routers, switches, and/or other computing or networking devices.

Security administrators often perform computer network audits to collect information about devices on computer networks (e.g., to determine attributes associated with devices on computer networks, such as services, etc.). For example, an audit can be used to identify which computers are on a network, determine which ports are open on a particular computer on the network (e.g., performing port scanning to determine which ports are active/listening on target hosts), and what services are being offered via any such ports. This information can be used by a security administrator to verify that only approved services are being provided, and that those services are up-to-date, and/or are not otherwise vulnerable to attacks.

BRIEF DESCRIPTION OF THE DRAWINGS

Various embodiments of the invention are disclosed in the following detailed description and the accompanying drawings.

DETAILED DESCRIPTION

Figure 1:
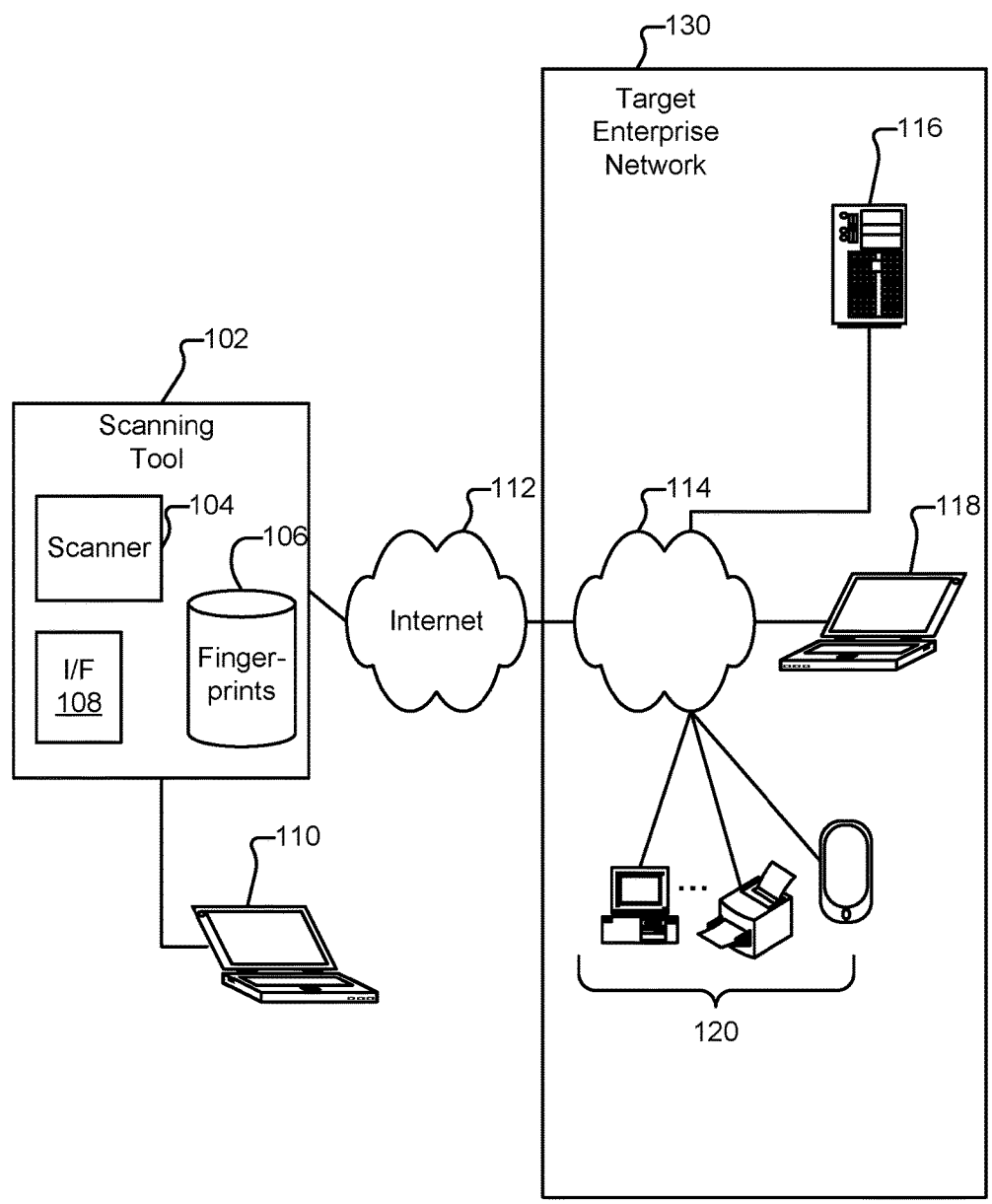
FIG. 1 is an illustration of an enterprise network in which an attacker performs a scan of target devices and various attributes of target devices of the enterprise network.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A computer network audit can be performed using a manual and/or an automated approach to collect information about devices (e.g., hosts, network devices, etc.) and services associated with a computer network. For example, manual computer network audits can include performing security vulnerability scans, reviewing application and operating system versions and access controls, and determining physical access to the systems. Automated computer network audits can include system generated audit reports or using software to monitor and report changes to files and settings on devices on the computer network. Example devices can include personal computers, laptops, mobile devices (e.g., tablets, mobile phones, and/or other mobile devices), servers, appliances mainframes, network routers, switches, and/or other computing or networking devices.

Security administrators often perform computer network audits (e.g., using various network audit/scanning tools) to collect information about devices on computer networks (e.g., to determine attributes associated with devices on computer networks, such as services, etc.). For example, a network security audit/scan can be used to identify which computers (e.g., desktop computers, laptop computers, servers, appliances, and/or other computing devices) are on a network, determine which ports are open on a particular computer on the network (e.g., performing port scanning to determine which ports are active/listening on target hosts), and what services are being offered via any such ports. This information can be used by a security administrator to verify that only approved services are being provided, and that those services are up-to-date, and/or are not otherwise vulnerable to attacks.

An example network security audit/scanning tool is Nmap (Network Mapper). Generally, Nmap is a free and open source licensed utility for network discovery and security auditing. For example, Nmap is a network security audit/scanning tool that can be used to discover devices and services (e.g., including operating system detection, application and version detection, port scanning, to generate scan reports that can fingerprint devices on a network, including fingerprinting of various attributes associated with each device such as its operating system (OS) and version as well as open ports and services, to attempt to classify devices and map a network, etc.) on a computer network to create an audit/scanning report of the computer network. Nmap can discover devices, such as hosts, and services, such as services provided by detected hosts, on a computer network by sending particular packets to each target device and analyzing their responses (e.g., by sending raw IP packets in particular ways to determine what hosts are available on the network, what ports are open on detected hosts, what services, such as application(s) and version(s) are active/available on detected hosts, what operating systems (OS) and OS version are installed on detected hosts, what type of firewalls are in use on the network, and various other characteristics can be determined using Nmap to scan the network). In some cases, these features can be extended using scripts that provide more advanced service detection, vulnerability detection, and other features.

Various other network security audit/scanning tools can be used to perform an audit/scan of a computer network (e.g., and, in some cases, fingerprinting devices on the computer network). Example network security audit/scanning tools are also available from Metasploit®, Rapid 7, hping, Scapy, and/or other commercially available, open source, and freeware tools.

Various tasks such as performing network inventory and monitoring availability of network nodes (e.g., including open ports and available services) are also typically performed using such scanning techniques. There are many legitimate purposes and uses of such network scanning tools, such as by network/security admins to perform audits of their own networks.

However, in some cases, such as when an attack is being perpetrated by an attacker against a computer network (e.g., a target network), the attacker (e.g., an unauthorized user) may attempt to learn more information about nodes available on the computer network by performing assorted scans of the target network. For example, the attacker can scan the target network to identify various nodes with certain attributes on the ACME Company enterprise network in an attempt to identify a vulnerable node for exploiting (e.g., to perform further unauthorized activities, such as to attempt to use the node in a command and control attack, to obtain information available on the node or other nodes on the computer network, etc.). Unfortunately, attackers typically attempt to conceal information about their activities to help evade detection using traditional security techniques, such as firewalls and/or host security techniques.

Therefore, new and improved techniques are needed to detect such attacks. For example, it would be desirable to attempt to identify attacker activities attempting to scan an enterprise network. However, as discussed above, attackers typically attempt to conceal information about their scanning activities to help evade detection using traditional security techniques, such as firewalls and/or host security techniques. As discussed below, new and improved techniques are disclosed that can facilitate identification of such attacker activities attempting to scan a network (e.g., a target network, such as an enterprise network or other networks).

Accordingly, techniques for generating a honey network configuration to emulate a target network environment are disclosed.

In some embodiments, techniques for generating a honey network configuration to emulate a target network includes receiving a network scan survey of the target network; generating the honey network configuration to emulate the target network using the network scan survey of the target network; and executing a honey network (honeynet) using the honey network configuration. In some embodiments, techniques for generating a honey network configuration to emulate a target network further includes translating the network scan survey into a representation of a plurality of devices and a plurality of services; determining a set of attributes associated with each of the devices and each of the services; and determining a set of responses for each of the devices and each of the services in response to a probe.

In some embodiments, techniques for generating a honey network configuration to emulate a target network include receiving a honey network configuration to emulate the target network; receiving a probe sent to an IP address that is in the honey network; and sending a response to the probe, in which the response is generated using the honey network configuration. In an example implementation, a virtual machine (VM) instance can be instantiated in a VM environment (e.g., an instrumented VM environment) to emulate the honey network based on the honey network configuration.

Accordingly, various techniques for generating a honey network configuration to emulate a target network are disclosed. For example, using such techniques can facilitate an efficient and lightweight approach for implementing the honey network configuration to emulate the target network using an instrumented VM environment. As will be apparent to one skilled in the art in view of the various techniques and embodiments described herein, while the various techniques described herein for generating a honey network configuration to emulate a target network are described with respect to virtual environments using a security service (e.g., a cloud security service), such techniques can similarly be applied to various other computing environments, including, for example, performed in part or completely using computing devices that can be local or remote to the target network, such as appliances, servers, and/or other computing devices capable of implementing various techniques using a VM environment such as disclosed herein.

Scanning a Target Network

FIG. 1 is an illustration of an enterprise network in which an attacker performs a scan of target devices and various attributes of target devices of the enterprise network. In the example shown, scanning tool 102 includes a scanner 104, which can be executed on a processor of device 110 and/or some other computing device, a fingerprint data store 106, and an interface 108. As used herein, a target device and attribute detection attempt on a target network (e.g., a target network environment) is also referred to herein as a scan. As shown in this example, detection tool 102 and computing device 110 (e.g., a laptop or another computing device) are in communication with a target enterprise network 130 via the Internet 112. As also shown, enterprise network environment 130 includes a variety of remote computers, such as a server 116, a laptop computer 118, and various other devices 120 (e.g., a desktop computer, a printer, a tablet, a smartphone, and/or various other devices that can communicate with enterprise network 114) in communication via an enterprise network 114, which are each members of enterprise network 130 as shown.

Assume that in this example, device 110 is a computer controlled by a nefarious individual, such as an attacker or other unauthorized user, who is attempting to scan target enterprise network 130. In particular, the attacker can attempt to explore various nodes that are members of enterprise network 130 by performing scans to attempt to identify target devices and attributes of such target devices in communication with enterprise network 114 using scanning tool 102 to perform various scans of enterprise network 130. Using such scanning operations performed by scanning tool 102, the attacker can identify a variety of devices that are members of enterprise network 130, including, for example, servers, desktop computers, laptops, networked printers, and/or various other mobile or other networking/computing devices. Scanning tool 102 can be provided by various network security audit/scanning tools available from Nmap, Metasploit®, Rapid 7, hping, Scapy, and/or other commercially available, open source, and freeware tools, such as discussed above.

When attempting to scan a target network by an attacker for nefarious or undesirable purposes, different reactions can be made, for example, to the discovery of a printer than to the discovery of various other devices, such as a router, wireless access point, Android® or Apple iOS® smart phone or tablet, Microsoft Windows® desktop, and/or UNIX server, etc. The ability to detect attributes of a particular computing device, including, for example, information about the underlying operating system (OS) of the computing device can be used by attackers to identify target computing devices for certain attacks based on known vulnerabilities associated with particular attributes (e.g., a particular OS and patch version, a particular application version, available services on a host, etc.). As a result of such targeting risks due to attackers, many computer devices are configured to avoid disclosing their specific system attributes and OS configuration.

In some cases, an attacker can use scanning tool 102 to perform a scan of target devices of enterprise network 130 to determine attributes of a remote computing device in an attempt to determine a node's vulnerability to specific flaws/exploits. As an example, OS detection can be performed as part of a scan to identify specific flaws/exploits of a host (e.g., certain versions of a given operating system and/or application that can be remotely exploitable, such as by using known vulnerabilities in such software versions). As such, if an attacker can determine that a target system is running a particular version of an OS, then the vulnerability can be exploited by the attacker, which can compromise that host (e.g., potentially allowing the attacker to gain unauthorized access to various data stored on that computing device and/or various other computing devices of the enterprise network). For example, the attacker may be able to use a known vulnerability/exploit to attempt to gain control over node 118 (e.g., potentially enabling the attacker to install and execute command-and-control malware and/or other malware that can be used by the attacker for remote control over node 118 via communications over Internet 112).

As discussed above, various scanning tools exist. In this example, fingerprints data store 106 can be used as a reference database that includes heuristics for identifying different devices based on how they respond to various probes that can be used to perform different scanning operations. Probes can generally include various types of network packets, such as TCP packets, IP packets, UDP packets, ICMP packets, and/or other types of packets, that can be sent to the target network to determine, for example, what devices are on the target network and/or what services are available on a particular target device, and/or to perform various other scanning operations. For example, probes can be sent from scanning tool 102 to a target device (e.g., node 118 or another node) of target enterprise network 130. Specifically, scanner 104 generates and sends selected probes to a given target device, and then evaluates the responses to generate a fingerprint that can be used to identify various attributes of the target device, such as an operating system and version, open ports and available services, and/or other attributes. Scanning tool 102 can be configured to examine remote and/or local computers via one or more of a variety of public and/or private networks, including a SAN, LAN, WAN, or combination thereof. For example, scanning system 102 can be configured to interrogate open ports (e.g., open TCP ports, open UDP ports, and/or other open ports) to determine device type, OS type and version, available services, and/or other attributes associated with the target device.

As such, it would be desirable to attempt to identify such attacker/unauthorized activities attempting to scan an enterprise network. However, as discussed above, attackers typically attempt to conceal information about their scanning activities to help evade detection using traditional security techniques, such as firewalls and/or host security techniques. As discussed below, new and improved techniques are disclosed that can facilitate identification and logging of such attacker/unauthorized activities attempting to scan an enterprise network.

Figure 2:
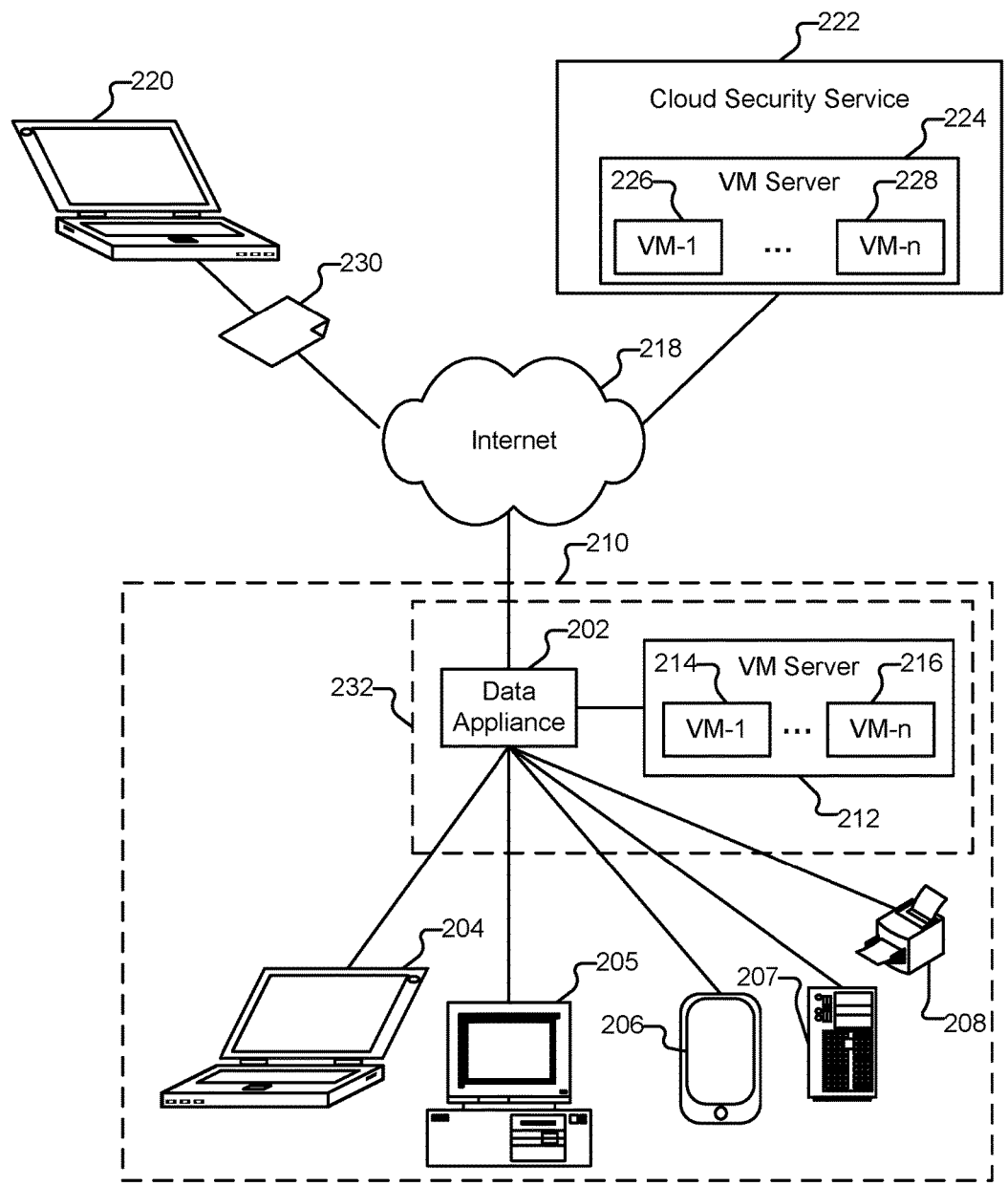
FIG. 2 is a functional diagram of an architecture for generation of a honey network configuration to emulate a target network environment in accordance with some embodiments.

Overview of an Architecture for Generation of a Honey Network Configuration to Emulate a Target Network Environment FIG. 2 is a functional diagram of an architecture for generation of a honey network configuration to emulate a target network environment in accordance with some embodiments. For example, such an environment can facilitate identification and logging of attacker activities attempting to scan an enterprise network and, as such, can be used to prevent delivery and/or proliferation of malware on the target network (e.g., a malware sample that may be potential or known malware, in which malware generally refers to various forms of malicious software, links to malicious software, etc., which can be embedded with a file, email, attachment to an email, web page, web download file, linked to a resource that includes the malicious software, and/or using various other delivery and distribution mechanisms), which can be various types of advanced threats, such as Advanced Persistent Threats (APTs) (e.g., technically advanced adversaries that employ various techniques using malware to exploit vulnerabilities in systems and often using an external command and control (C&C) for continuously monitoring and extracting data from a specific target, often using stealthy, persistent methods that can evade traditional security measures, such as signature-based malware detection measures) or other advanced threats (e.g., malicious software can include any malicious computer code or executable program, such as active content, executable code, and scripts, that can interfere with operation of a computing device or computer network, attempt unauthorized access of data or components of a computing device, and/or perform various other malicious, unauthorized, and/or undesirable activities). In particular, a variety of attempts by an unauthorized person (e.g., an attacker) to attempt to scan an enterprise network 210, which can then be used to target devices on the enterprise network in order to, for example, propagate malware (e.g., malware 230) via system 220 (e.g., any type of computing device) and/or to perform various other unauthorized/undesirable actions are described, as are techniques for generation of a honey network configuration to emulate a target network environment to facilitate identification and logging of such attacker activities attempting to scan enterprise network 210.

As used herein, a honey network generally refers to a virtual emulation of a plurality of devices and/or services in communication with a target network. For example, a honey network can be generated to emulate a target enterprise network or other computer network that can include a variety of devices, such as servers, appliances, desktop computers, mobile computers including laptops, tablets, smart phones, printers, networking devices including routers, and/or various other devices capable of wireless or wired-based network communications, which can provide various services in communication over the network. In some cases, all or a subset of devices of the target network can be emulated, in which a configuration of each of such emulated devices can be accurately represented in response to one or more types of probes used by network scanning tools (e.g., Nmap and/or other network scanning tools that send various probes to attempt to determine device type, operating system type and version, and/or various services offered by a device, such as services associated with an open port of the device in communication with the network).

In the example shown in FIG. 2, various devices 204-208, shown as a laptop computer 204, a desktop computer 205, a tablet 206, a server 207, and a printer 208, are present in enterprise network 210. Data appliance 202 is configured to enforce policies regarding communications between devices, such as client devices 204-206 as well as other devices, such as servers (207) and printers (208), etc., and nodes outside of enterprise network 210 (e.g., reachable via external network 218, such as the Internet). Examples of such policies include ones governing traffic shaping, quality of service, and routing of traffic. Other examples of policies include security policies such as ones requiring the scanning for threats in incoming (and/or outgoing) email attachments, website downloads, files exchanged through instant messaging programs, and/or other file transfers. In some embodiments, appliance 202 is also configured to enforce policies with respect to traffic that stays within enterprise network 210.

Appliance 202 can take a variety of forms. For example, appliance 202 can be a dedicated device or set of devices. The functionality provided by appliance 202 can also be integrated into or executed as software on a general purpose computer, a computer server, a gateway, and/or a network/routing device. As an example implementation, an architecture for such a data appliance is further described below with respect to FIG. 3.

As will be described in more detail below, appliance 202 can be configured to work in cooperation with one or more virtual machine servers (212, 224) to perform various techniques for generation of a honey network configuration to emulate a target network environment using an instrumented virtual machine environment as disclosed herein. As one example, data appliance 202 can be configured to communicate with VM server 212, and VM server 212 can be configured to execute a virtual machine environment (e.g., using one or more VM instances, such as VM-1 214 and VM-n 216) for generation of a honey network configuration to emulate a target network environment for enterprise network 210 as further described herein. As another example, appliance 202 can be in (secure) communication with a cloud security service 222, which includes VM server 224, and VM server 224 can be configured to execute a virtual machine environment for generation of a honey network configuration to emulate a target network environment for enterprise network 210 as further described herein. For example, one or more devices of enterprise network 210 can be emulated such that when an attacker attempts to scan the emulated devices, the scanning tool used by the attacker would receive responses to various probes that would be processed by the scanning tool to indicate that such device(s) exist and have particular attributes (e.g., certain OS and version, particular services running on given port numbers, etc.), such as using various techniques for generation of a honey network configuration to emulate a target network environment using an instrumented virtual machine environment as disclosed herein.

An example of a virtual machine server is a computing device that can execute virtualization software, such as a commercially available desktop or laptop computing hardware (e.g., an Intel® Core™ i7 processor) or commercially available server-class hardware (e.g., a multi-core processor such as a dual 6-core Intel® processor with Hyper-Threading, four or more Gigabytes of RAM such as a 128 GB RAM, a system disk such as a 120 GB SSD, and one or more Gigabit network interface adapters). Such a virtual machine server can be configured to execute commercially available virtualization software, such as VMware ESXi, Citrix XenServer, or Microsoft Hyper-V (e.g., such a VM environment can emulate the Windows® XP operating system environment using the dual 6-core Intel® processor with Hyper-Threading and 512 MB of RAM, the Windows® 7 operating system environment using the dual 6-core Intel® processor with Hyper-Threading and 1 GB of RAM, and/or other operating system environments and/or using different hardware capacity/components). The virtual machine servers may be separate from, but in communication with, data appliance 202, as shown in FIG. 2. A virtual machine server may also perform some or all of the functions of data appliance 202, and a separate data appliance 202 is omitted as applicable. Further, a virtual machine server may be under the control of the same entity that administers data appliance 202 (e.g., virtual machine server 212); the virtual machine server may also be provided by a third party (e.g., virtual machine server 224, which can be configured to provide services to appliance 202 via third party service 222). In some embodiments, data appliance 202 is configured to use one or the other of virtual machine servers 212 and 224 for generation of a honey network configuration to emulate a target network environment for enterprise network 210. In other embodiments, data appliance 202 is configured to use the services of both servers (and/or additional servers not shown). Thus, in some implementations, the cloud security service can be delivered either as a public cloud or as a private cloud (e.g., deployed locally on an enterprise network using a locally deployed data appliance, server, or other computing device that executes the VM environment).

In some embodiments, the virtual machine server 224 is configured to implement various emulation-based techniques for generation of a honey network configuration to emulate a target network environment for enterprise network 210 using an instrumented virtual machine environment as described herein with respect to various embodiments (e.g., implemented using instrumented VM environments 226 and 228, which can be executed by cloud security service 222 and/or malware analysis system 232, such as further described below with respect to FIGS. 3 through 7, and with respect to various other embodiments disclosed herein). For example, the virtual machine server 224 can provide an instrumented virtual machine environment capable of performing the various techniques as described herein. These instrumented virtual machine (VM) environments 226 and 228 can include, for example, various network activity logging, user level hooks, and/or kernel level hooks in the emulated execution environment to facilitate the monitoring of various network and/or program related activities and/or behaviors during emulation using the virtual environment (e.g., instrumented VM environments, such as described above) and to log such monitored activities and/or behaviors for analysis based on the various techniques described herein with respect to various embodiments.

Figure 3:
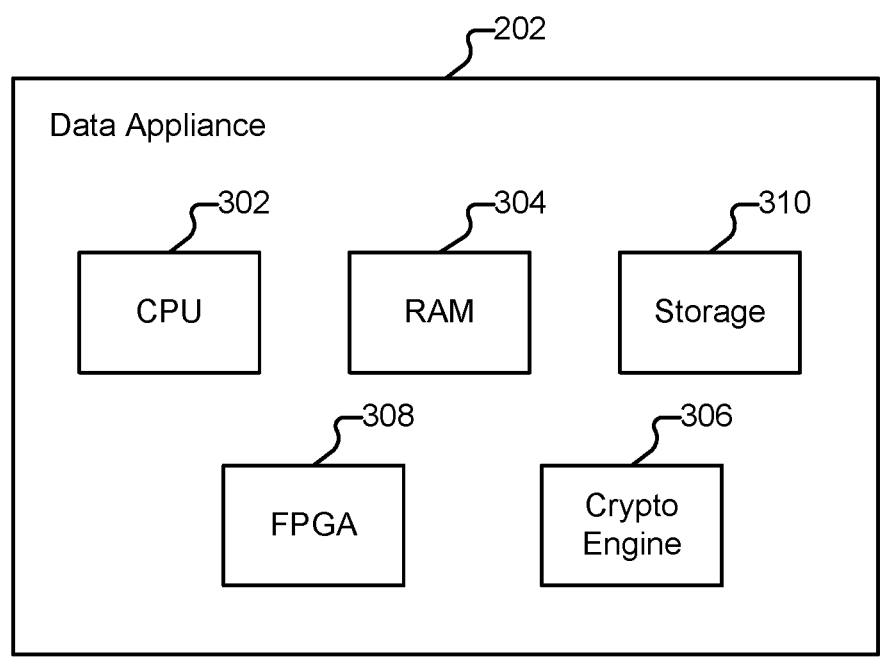
FIG. 3 illustrates a data appliance in accordance with some embodiments.

FIG. 3 illustrates a data appliance in accordance with some embodiments. The example shown is a representation of physical components that are included in data appliance 202, in some embodiments. Specifically, data appliance 202 (e.g., a device that performs various security related functions, such as a security device, which can be in the form of, for example, a security appliance, security gateway, security server, and/or another form of a security device) includes a high performance multi-core CPU 302 and RAM 304. Data appliance 202 also includes a storage 310 (such as one or more hard disks), which is used to store policy (e.g., layer-3 destination IP-based routing rules, firewall rules, etc.) and other configuration information. Data appliance 202 can also include one or more optional hardware accelerators. For example, data appliance 202 can include a cryptographic (crypto) engine 306 that can perform encryption and decryption operations, and one or more FPGAs 308 that can perform matching, act as network processors, and/or perform other tasks.

Whenever appliance 202 is described as performing a task, a single component, a subset of components, or all components of appliance 202 may cooperate to perform the task. Similarly, whenever a component of appliance 202 is described as performing a task, a subcomponent may perform the task and/or the component may perform the task in conjunction with other components. In various embodiments, portions of appliance 202 are provided by one or more third parties. Depending on factors such as the amount of computing resources available to appliance 202, various logical components and/or features of appliance 202 may be omitted and the techniques described herein adapted accordingly. Similarly, additional logical components/features can be added to system 202 as applicable.

In one embodiment, data appliance 202 can perform IP-based routing of traffic (e.g., based on layer-3 destination IP-based routing rules) to route traffic sent to specific destination IP addresses (e.g., destination IP addresses associated with emulated devices of a honey network configuration to emulate a target network environment) to a VM server (e.g., a specific VM instance executed on the VM server that is implementing the honey network based on the honey network configuration). For example, the VM server can be a local VM server (e.g., VM server 212) or a remote VM server (e.g., VM server 224 of cloud security service 222). In an example implementation, if the VM server is configured as a remote VM server (e.g., VM server 224 of cloud security service 222), then data appliance 202 can provide for secure routing of such traffic communications with another data appliance at cloud security service 222 using a secure protocol (e.g., via a VPN, using Internet Protocol Security (IPsec) or another secure protocol) over Internet 218. These and other techniques for facilitating generation of a honey network configuration to emulate a target network environment are further described below with respect to FIG. 4.

Figure 4:
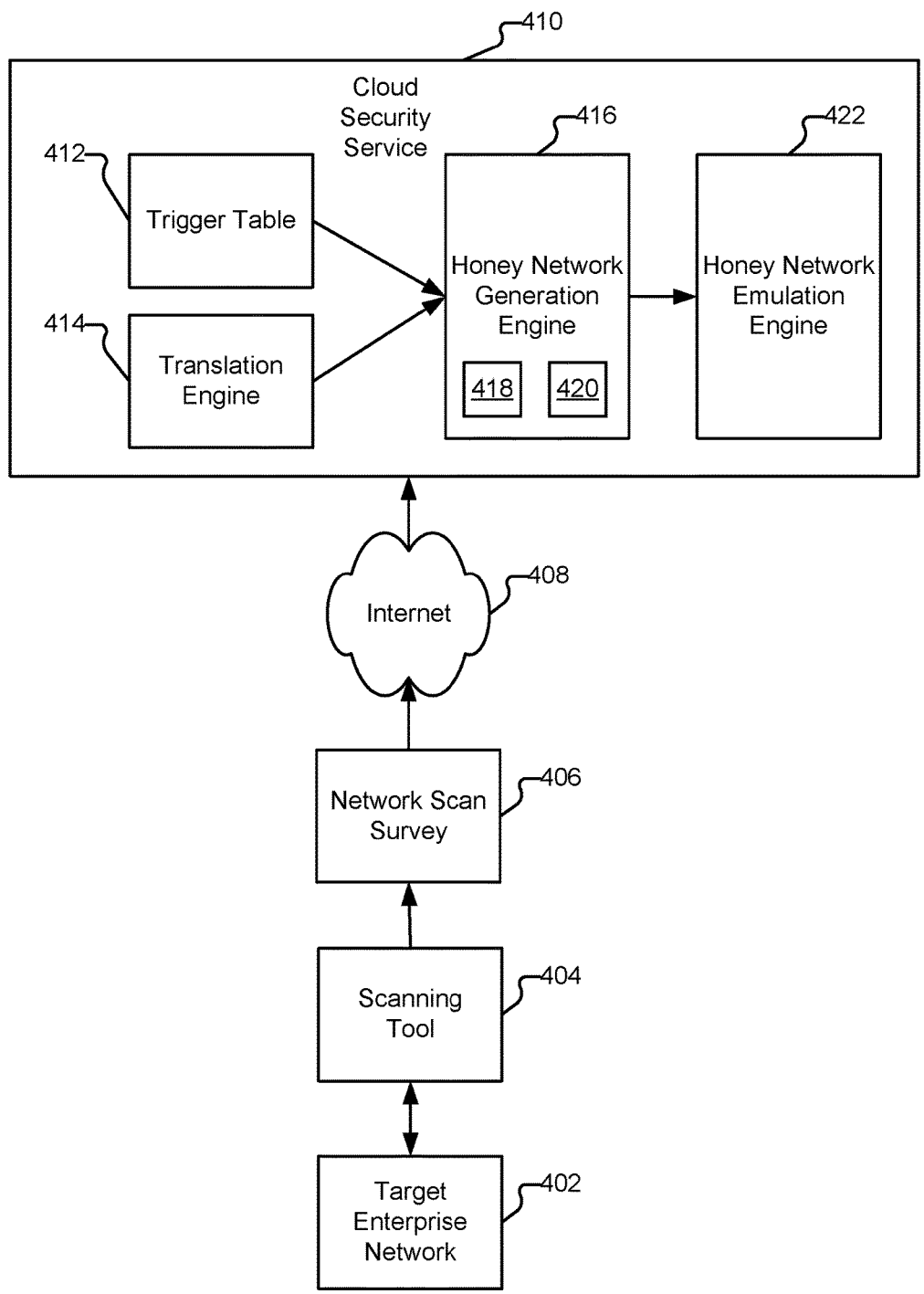
FIG. 4 is a functional block diagram illustrating techniques for generating a honey network configuration to emulate a target network environment in accordance with some embodiments.

Techniques for Generating a Honey Network Configuration to Emulate a Target Network Environment FIG. 4 is a functional block diagram illustrating techniques for generating a honey network configuration to emulate a target network environment in accordance with some embodiments. In an example implementation, generation of a honey network configuration to emulate a target network environment can be performed on an appliance or a computing device that is locally connected to or in local network communication with the target enterprise network (e.g., performed using a device that is also a member of the target enterprise network). In another example implementation, generation of a honey network configuration to emulate a target network environment can be performed using a cloud security service, such as shown in FIG. 4 and further described below.

As shown, a target enterprise network 402 is scanned using scanning tool 404 to generate results of various scanning operations, which is provided in an output result that is generally referred to as a network scan survey 406. For example, a scanning tool, such as Nmap or another scanning tool such as discussed above, can be used to perform a scan of devices on the target enterprise network to generate the network scan survey, such as similarly described above. The network scan survey can be provided to a cloud security service 410 (e.g., using a secure communication protocol, such as Internet Protocol Security (IPsec) or another secure protocol) over Internet 408.

As also shown, cloud security service 410 includes a trigger table 412 and a translation engine 414. Translation engine 414 translates network scan survey 406 (e.g., an XML or another format of the network scan survey) into a data representation (e.g., data in a specified format or data structure) that can be processed by honey network generation engine 416. Trigger table 412 represents a set of data that indicates responses to a given scanning tool's probes that are expected to generate a particular result, such as responses that can be used by the scanning tool to identify a device type, an operating system type and version, and/or services provided by the device. In one embodiment, the trigger table is provided for each scanning tool as a commercially available trigger table for the scanning system. In one embodiment, the trigger table is generated by automatically parsing publicly available source code for the scanning system (e.g., parsing one or more triggers that are used to generate each fingerprint for each device, service, and attributes that can be processed and reported based on probes sent and probe responses received by the scanning system, such as Nmap and/or other open source scanning tools, in which the parsing of such Nmap/other scanning tool's source code can be performed for each new version/release of that scanning tool to generate a trigger table for each new version/release of that scanning tool).

Cloud security service 410 also includes honey network generation engine 416 to generate a honey network configuration based on the input received from trigger table 412 and translation engine 414 to emulate target enterprise network 402. In one embodiment, honey network generation engine 416 automatically generates a systems table 418 and a services table 420. For example, systems table 418 can include entries for each device to be emulated in the honey network. In some cases, an entry for a given emulated device can include an IP address assigned to the emulated device, a device type identification, an operating system (OS) type, and version (as applicable or if available from the translated network scan survey). As another example, services table 420 can include entries for each service to be emulated in the honey network. In some cases, an entry for a given emulated service can include an IP address associated with the emulated service, a port number, and a service type identification (as applicable or if available from the translated network scan survey). In one embodiment, honey network generation engine 416 also processes trigger table 412 to include probe responses for each emulated system in the systems table and for each emulated service in the services table with responses to provide to specific probes received from a scanning tool in order to provide responses that would be processed by the scanning tool to properly identify the emulated system and/or emulated service. For example, entries in each table (e.g., the systems table and the services table) can be updated to include such responses to be provided in response to each particular probe. In another embodiment, the appropriate/expected probe responses for each emulated system can be determined at run-time by honey network emulation engine 422 (e.g., during execution in a VM instance when probes are received by the honey network) using trigger table 412 as well as systems table 418 and/or services table 420.

Cloud security service 410 also includes honey network emulation engine 422 to emulate a honey network configuration based on the output received from honey network generation engine 416 to emulate target enterprise network 402. In one embodiment, honey network emulation engine 422 is executed on a processor as a virtual machine (VM) instance in a virtual machine (VM) environment to emulate devices and/or services of the target enterprise network based on systems table 418 and services table 420. For example, honey network emulation engine 422 can be implemented to respond to a scanning tool's probes using the systems table and the services table (e.g., and, in some implementations, using the trigger table at run-time, such as described above) to provide appropriate responses to each probe as further described below. In an example implementation, the honey network emulation engine can be executed in a VM environment on a processor, such as a laptop, desktop, appliance, server, or another computing device, such as described above.

For example, the honey network emulation engine can be used to emulate a set of devices and services of a target enterprise network to emulate the virtual existence of such devices and services to provide a realistic view of such devices and services that can be replicated in the honey network. In particular, this approach does not require that these devices and services need to be fully emulated, which would typically require more heavyweight processing requirements in a VM environment. Rather, this approach facilitates a realistic emulation from a perspective of a network scanning tool that may be performed by an attacker or other unauthorized user attempting to identify devices and services on the honey network as further described below.

As a result, devices and services in the honey network can appear to an attacker or other unauthorized, based on a network scan survey (e.g., Nmap scan results or other scanning tool results), to be part of an enterprise's actual network (e.g., to be actual, physical devices and/or actual, active services, etc.). As such, probe responses provided by the honey network emulation engine are generated and sent in order to fool the network scanning tool into determining that an emulated device, IP address, and/or services are present in the honey network (e.g., particular devices with various attributes, IP address, OS type and version, and/or services on certain ports are present based on the probe responses received by the network scanning tool from the honey network emulation engine).

In one embodiment, the honey network emulation engine responds to various packets that are directed to the honey network (e.g., responding to probes received from Nmap scans and/or other network scanning tools) to provide responses (e.g., to send certain packets and/or to not send any packets) that would be interpreted by such security scan tool(s) to report the emulated device and services representation for each IP address in the honey network. For example, Nmap is a network scanning tool that can report hundreds or possibly thousands of different services, so there are many variations that can exist and be reported based on an Nmap network scan of a given target network. As such, the honey network emulation engine can be configured to be able to generate robust and diverse sets of devices (e.g., using different systems tables and services tables) to provide responses to different Nmap probes to indicate that certain IPs exist and are associated with certain attributes (e.g., system type, OS type and versions, application type and versions, ports and running services, etc.) to facilitate emulation of variations that can exist between different enterprise networks to be emulated in whole or in part as a virtual representation of such target enterprise networks, which is more likely to also not be easily detected as a virtual copy of the target enterprise network by an attacker using various network scans to survey the target enterprise network.

As an example use case scenario, a network admin or security admin of the enterprise network or a third party security provider can perform a network scan (e.g., using a network scanning tool, such as Nmap or other network scanning tools) to scan a portion or all of their enterprise network. The results of the network scan, the network scan survey, can then be imported and processed by the translation engine to facilitate a generation of a honey network configuration to emulate the devices and services identified in the network scan survey. For instance, an Nmap survey (e.g., Nmap scan report of (a portion of) the target enterprise network, which can include desktops, servers, printers, appliances, mobile devices, etc., which can be associated with certain attributes, including open ports and active services, etc.) can be used to generate an automated copy of the scanned network based on that ingested Nmap survey to generate a honey network representation of such scanned devices and services using the techniques described herein.

In an example implementation, the honey network can emulate the devices and services identified in the network scan survey of the target enterprise network using different assigned IP addresses to be associated with the emulated devices and services. As an example, such different IP addresses can be IP addresses selected from an additional subnet IP address space of the enterprise target network. This approach of using different IP addresses can avoid potential conflicts with IP addresses of existing, real systems and services of the target enterprise network (e.g., to avoid confusion or errors that could arise if legitimate users or services attempted to communicate with such virtual devices and virtual services in the IP subnet associated with the honey network). As a result, if an attacker identifies the existence of the subnet of IP addresses that are actually associated with the honey network, then the attacker would potentially attempt to scan one or more IP addresses that are actually associated with the emulated honey network. This allows for such illegitimate attacker probing and other activities in the honey network to be logged and monitored, such as by the cloud security service. As discussed above, the emulated honey network is configured to respond to any such illegitimate attacker probing by providing expected responses that would make it very difficult for the attacker to be able to distinguish the emulated honey network from the actual physical network of the target enterprise network (e.g., as the only differences that would be evident based on network scans would just be different IP addresses associated with the virtual and the physical devices and services).

In one embodiment, an Nmap survey (e.g., an XML, formatted document that is generally intended for human readable consumption) is translated by the translation engine to be in a data representation that can be processed by the honey network generation engine (e.g., using a script(s) and/or a computer program(s) executed on a processor to parse and process the Nmap survey in order to translate the Nmap survey into another data representation that can by processed by the honey network generation engine). In an example implementation, the translation engine can also map each actual IP address value of each device detected in the Nmap survey results of the target enterprise network to a target IP address in the IP address space associated with the honey network. In some cases, for each device with an actual $IP_x$ value in the target enterprise network based on the Nmap survey, results can be mapped to a new target $IP_y$ value with the same associated attributes (e.g., device type, OS type and version, application type and version, open port numbers, services on such open ports, etc.) to include in the honey network to be generated.

In one embodiment, a services table is generated by the honey network generation engine. In an example implementation, a key for each service can be generated using the assigned new target IP address value (e.g., $IP_y$) and using the port number (e.g., the port number associated with a given service, such as Apache version 2 (v2) or another service, in which the port number is extracted from the Nmap survey results), such as further described below. As a result, the key is uniquely associated with the emulated service in the services table (e.g., based on its assigned IP address and port number), which also facilitates efficient lookup operations for the emulated service using the services table, such as further discussed below.

In one embodiment, a systems table is generated by the honey network generation engine. As an example, the systems table can be generated using an array for each target IP address value (e.g., $IP_y$) for the emulated system. In some cases, the array for $IP_y$ can be initialized with certain default values that can subsequently be updated based on the trigger table (e.g., a default TTL, ARP response, ICMP ECHO can be initialized with zeroes if Nmap survey results do not provide data for such values). If certain values for some of these attributes are present from the parsed Nmap survey results, then such values can be populated accordingly in the systems table by the honey network generation engine.

In one embodiment, the honey network generation engine is implemented as a single lightweight process, in which these engines and modules can be implemented using executable programs (e.g., using Python code, Java code, and/or other programming languages). In an example implementation, the honey network generation engine can be executed using commercially available personal computing (PC) hardware and/or using more powerful hardware, such as described above.

Whenever cloud security service 410 is described as performing a task, a single component, a subset of components, or all components of cloud security service 410 may cooperate to perform the task. Similarly, whenever a component of cloud security service 410 is described as performing a task, a subcomponent may perform the task and/or the component may perform the task in conjunction with other components. In various embodiments, additional logical components/features can be added to cloud security service 410 as applicable.

As described above with respect to FIG. 4, a network scan survey (e.g., an Nmap survey or other network scanning tool's survey) can be used as input to generate a honey network configuration to emulate a subset of or an entire target enterprise network. The honey network can be emulated using a honey network VM instance executed in a virtual environment that is configured to respond to network scan probes (e.g., from an attacker or other unauthorized network scanning activity) in order to emulate the target enterprise network using the honey network configuration, as further described below with respect to FIG. 5.

Figure 5:
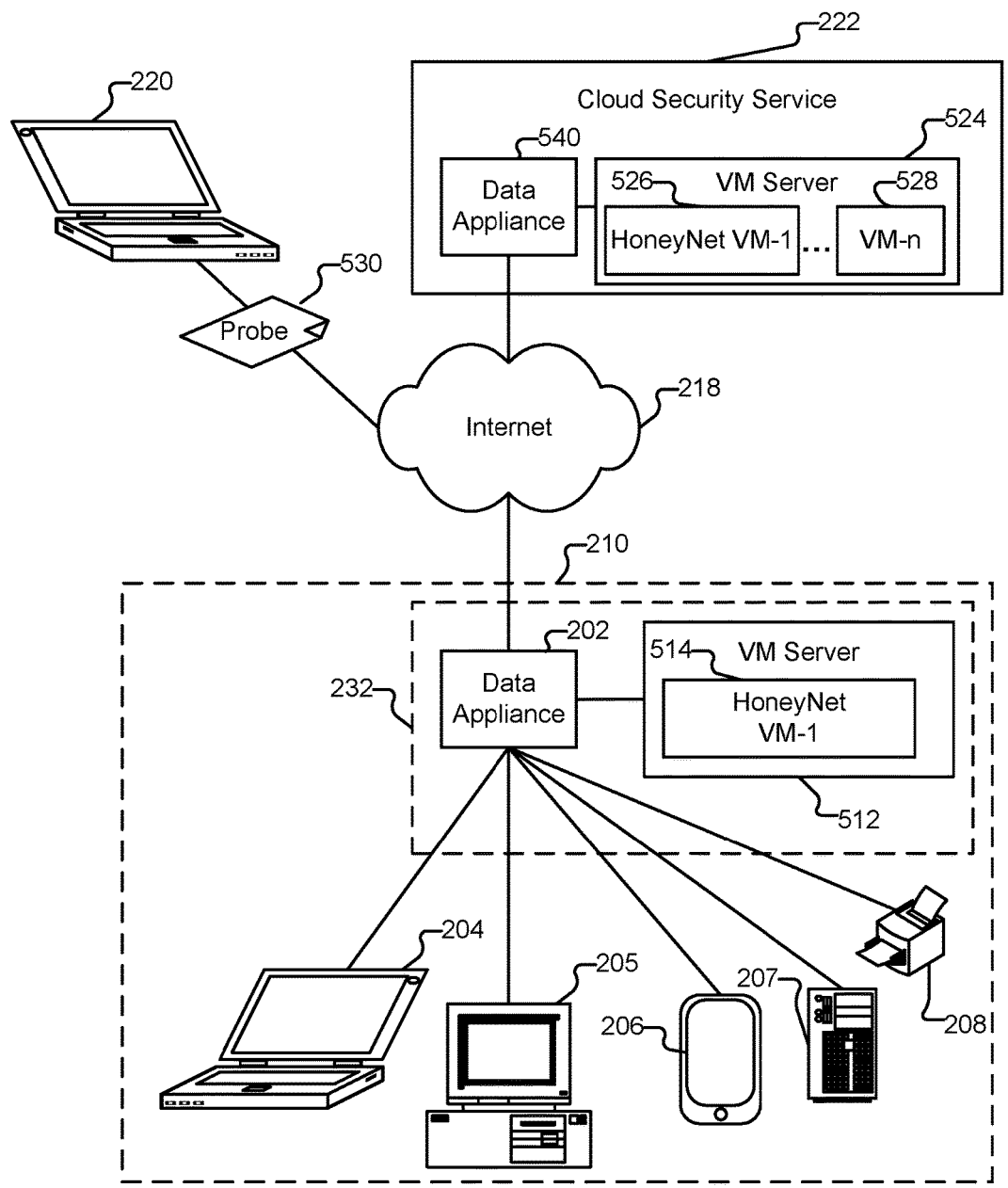
FIG. 5 is a functional block diagram illustrating techniques for implementing a honey network configuration to emulate a target network environment in accordance with some embodiments.

Techniques for Implementing a Honey Network Configuration to Emulate a Target Network Environment to Respond to Network Scans from an Unauthorized User FIG. 5 is a functional block diagram illustrating techniques for implementing a honey network configuration to emulate a target network environment in accordance with some embodiments. In one embodiment, an architecture for implementing a honey network configuration to emulate a target network environment can be implemented using an architecture as similarly described above with respect to FIG. 2. In one embodiment, cloud security service 222 includes the components and performs the operations for generating a honey network configuration and implementing a honey network emulation as similarly described above with respect to FIG. 4 (e.g., some or all of the components shown as implemented using cloud security service 410 can be implemented using cloud security service 222). In one embodiment, malware analysis system 232 includes the components and performs the operations for generating a honey network configuration and implementing a honey network emulation as similarly described above with respect to FIG. 4 (e.g., some or all of the components shown as implemented using cloud security service 410 can be implemented using malware analysis system 232, such that the honey network emulation can be implemented using a VM instance(s) executed on a computing device within a customer's enterprise network instead of using a cloud security service, such as using a private cloud).

As will be described in more detail below, appliance 202 can be configured to work in cooperation with one or more virtual machine servers (512, 524) to perform various techniques for generation of a honey network configuration to emulate a target network environment using an instrumented virtual machine environment as disclosed herein. As one example, data appliance 202 can be configured to use VM server 512 to execute a virtual machine (VM) environment that implements a honey network configuration, shown as HoneyNet VM-1 instance 514, to emulate a target network environment for enterprise network 210 as further described herein (e.g., VM server 512 can be integrated with, in communication with, and/or executed on data appliance 202). As another example, appliance 202 can be in (secure) communication with cloud security service 222, which can use VM server 524 to execute a VM environment that implements a honey network configuration, shown as HoneyNet VM-1 instance 526, to emulate a target network environment for enterprise network 210 as further described herein. As also shown, VM server 524 can execute additional VM instances for emulating additional honey network configurations, shown as VM-n instance 528, which can be used for emulating (additional portions of) target enterprise network 210 or to emulate different enterprise networks (e.g., for enterprise networks of different customers of the cloud security service). For example, one or more target devices of enterprise network 210 can be emulated such that when an attacker attempts to scan the emulated devices, the scanning tool used by the attacker would receive responses to various security scan probes (e.g., generated and sent from the HoneyNet VM-1) that would indicate that such a target device(s) exists and has particular attributes (e.g., certain OS and version, particular services running on given port numbers, etc.), such as using various techniques for generation of a honey network configuration to emulate a target network environment using an instrumented virtual machine environment as disclosed herein.

An example of a virtual machine server is a computing device that can execute virtualization software, such as commercially available desktop or laptop computing hardware or commercially available server-class hardware, such as similarly described above with respect to FIG. 2. Such a virtual machine server can be configured to execute commercially available virtualization software, such as VMware ESXi, Citrix XenServer, or Microsoft Hyper-V, such as similarly described above with respect to FIG. 2. The virtual machine servers may be separate from, but in communication with, data appliance 202, as shown in FIG. 5. A virtual machine server may also perform some or all of the functions of data appliance 202 and/or data appliance 540, and a separate data appliance 202 is omitted as applicable. Further, a virtual machine server may be under the control of the same entity that administers data appliance 202 (e.g., virtual machine server 212). In some use case scenarios, the virtual machine server can be provided by a third party (e.g., virtual machine server 524, which can be configured to provide services to appliance 202 via third party cloud security service 222). In some embodiments, data appliance 202 is configured to use one or the other of virtual machine servers 512 and 524 for generation of a honey network configuration to emulate a target network environment for enterprise network 210. In other embodiments, data appliance 202 is configured to use the services of both servers (and/or additional servers not shown). Thus, in some implementations, the cloud security service can be delivered either as a public cloud or as a private cloud (e.g., deployed locally on an enterprise network using a locally deployed data appliance or server).

In some embodiments, the virtual machine server 224 is configured to implement various emulation-based techniques for generation of a honey network configuration to emulate a target network environment for enterprise network 210 using an instrumented virtual machine environment as described herein with respect to various embodiments (e.g., implemented using instrumented VM environments 526 and/or 528, which can be executed by cloud security service 222 and/or using instrumented VM environments 514, which can be provided by malware analysis system 232, such as further described below and with respect to various other embodiments disclosed herein). For example, the virtual machine server 524 can provide an instrumented virtual machine environment capable of performing the various techniques as described herein. These instrumented virtual machine (VM) environments 526 and 528 can include, for example, various network activity logging, user level hooks, and/or kernel level hooks in the emulated execution environment to facilitate the monitoring of various network and/or program related activities and/or behaviors during emulation using the virtual environment (e.g., instrumented VM environments, such as described above) and to log such monitored activities and/or behaviors for analysis based on the various techniques described herein with respect to various embodiments. For example, any network scan and/or other network activities with HoneyNet VM-1 instance can be captured in a network log (e.g., which may then capture unauthorized network scans performed by an attacker or other unauthorized user).

Referring to FIG. 5, an unauthorized user (e.g., attacker or other unauthorized user) can send one or more probes 530 using a network scanning tool (e.g., Nmap or another network scanning tool) executing on computing device 220 (e.g., a laptop or another computing device) that is in communication with enterprise network 210 via Internet 218. For example, the attacker can attempt to scan certain IP addresses discovered to be part of enterprise network 210. In some cases, the attacker may target one or more IP addresses that are in an IP address space of enterprise network 210 (e.g., a subnet of the enterprise network) that are in the honey network that is generated for enterprise network 210 using various techniques disclosed herein. For instance, when probe 530 is directed to an IP address that is in the honey network IP address space, then data appliance 202 (e.g., a firewall with routing layer-3 routing functionality) can route such IP packets associated with probe 530 to the honey network VM instance (e.g., HoneyNet VM-1 514 or 526) using various techniques as further described below.

As an example implementation for performing such routing to a honey network implemented using cloud security service 222, a secure tunnel (e.g., an IPSEC tunnel or another secure protocol can be used to create such a secure tunnel over Internet 218) can be used to connect data appliance 202 to data appliance 540 to facilitate network communications with VM server 524, which executes a VM instance for emulating the honey network (e.g., HoneyNet VM-1 526). For example, data appliance 202 can be configured with IP-based rules to route such traffic to an appropriate honey network using layer-3 destination IP-based rules such that traffic (e.g., including probes (530)) directed to any IP addresses in a particular honey network IP address range would be routed to that honey network (e.g., a honey network IP subnet address space). For example, attackers can often discover an IP address space of a targeted network (e.g., enterprise network 210) by scanning certain devices that are members of enterprise network 210 (e.g., routers on the enterprise network would typically be configured to include the honey network subnet). However, legitimate services/users would not typically attempt to communicate with such a honey network subnet, that is, legitimate/benign traffic would not have any reason to probe this subnet. Rather, only illegitimate, unauthorized, or attacker traffic would typically attempt to probe such a honey network subnet.

As further described below, the honey network (e.g., HoneyNet VM-1 526) can be configured to generate automated responses to various probes (530), which can then be routed by data appliance 540 via the IPSEC tunnel to data appliance 202, and data appliance 202 can then route such responses back to device 220. In some cases, device 220 can be a member of enterprise network 210 (e.g., the attacker may have physical access to such a device and/or has already remotely compromised a device that is a member of enterprise 210 and is remotely controlling that device), and the attacker is using such a device to probe other devices/members of enterprise network 210.

In this example, the honey network includes a set of additional IP addresses (e.g., additional IP addresses that are not associated with any actual, physical devices in enterprise network 210, but are used to be associated with virtual, emulated devices in the honey network that appear to be part of enterprise network 210 to an unauthorized user, such as an attacker). As a result, it is a likely scenario that such an attacker will eventually stumble into the honey network when attempting to survey the enterprise network that is extended to include IP addresses in the honey network (e.g., which may be implemented as a separate subnet IP address space of enterprise network 210). Once the attacker attempts to scan virtual devices associated with IP addresses in the honey network, the honey network emulation can process probes from the attacker's network scanning attempts and automatically generate responses for each scanned virtual device in the honey network, in which such responses would result in an appropriate fingerprint using a network scanning tool, such as Nmap or another network scanning tool, for each virtual device in the honey network, as further described below with respect to FIG. 7. The honey network VM environment can also be configured to log any activities, such as network activities to/from the honey network.

Accordingly, the generation and emulation honey network techniques disclosed herein provide an efficient approach to implementing a honey network. For example, these techniques allow for emulation of virtual devices in a honey network without requiring that the emulation perform a complete emulation of the emulated systems and services. As such, this approach also has a benefit of not causing undesired problems if legitimate users and/or legitimate services attempt to interact with any emulated systems and services of the honey network. The honey network does, however, provide appropriate system and service responses to network scans that are sent from an attacker or other unauthorized user using a network scanning tool (e.g., by providing expected responses to probes from an Nmap scan or other scanning tool, to generate desired fingerprints for any such emulated systems and services in the honey network).

Figure 6:
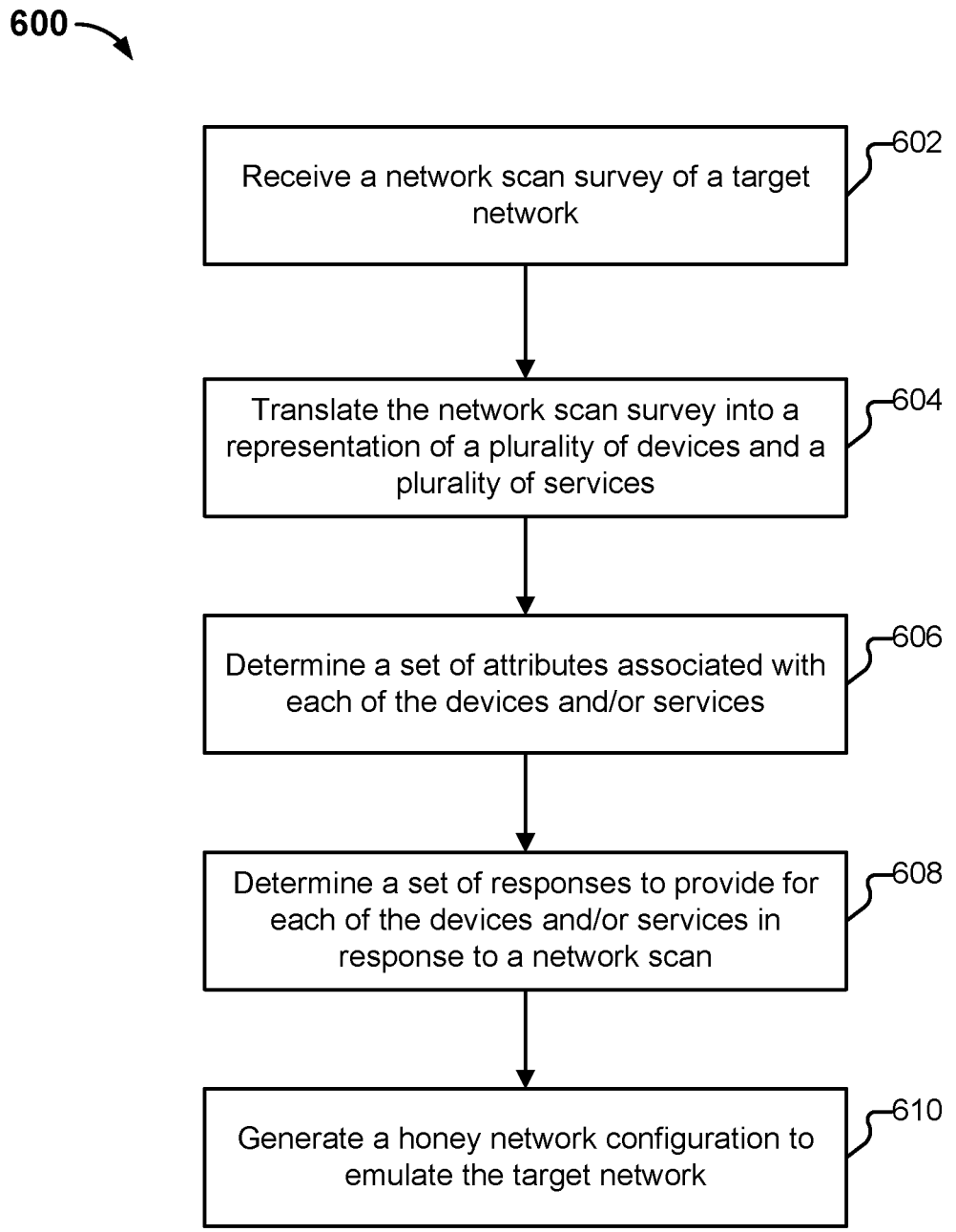
FIG. 6 is a flow diagram illustrating a process for generating a honey network configuration to emulate a target network environment in accordance with some embodiments.

Example Process for Generating a Honey Network Configuration to Emulate a Target Network Environment FIG. 6 is a flow diagram illustrating a process for generating a honey network configuration to emulate a target network environment in accordance with some embodiments. In one embodiment, process 600 is performed by malware analysis system 232. In one embodiment, process 600 is performed by cloud security service 222. The process begins at 602 when a network scan survey of a target network (e.g., an Nmap report or a network scan survey from another tool) is received. As one example, a network admin of the target enterprise network can perform a network scan of a subset or all of the target network and send the output of the network scan to malware analysis system 232 and/or cloud security service 222. As another example, the cloud security service provider can perform the network scan that can be then sent to malware analysis system 232 and/or cloud security service 222.

At 604, translating the network scan survey into a representation of a plurality of devices (e.g., systems and/or other devices, such as printers, routers, etc.) and a plurality of services (e.g., services that are associated with open ports on a particular system and/or other services) is performed. For example, the network scan survey can be output from a network scan tool that is in a particular format, such as eXtensible Markup Language (XML) or another format. In an example implementation, a translation engine of the cloud security service can parse the network scan survey (e.g., parsing the XML report) to translate it into a systems data representation and a services data representation (e.g., implemented as one or more tables or another type of a data structure) that can be processed and further populated with data using a honey network generation engine, such as described above with respect to FIG. 4. An example translation engine can be implemented in a programming language, such as Python, Java, or another programming language, which can be compiled and executed on a computing device as similarly described above with respect to FIG. 4. In one embodiment, the translation engine parses the network scan survey data to generate a systems table and a services table. For example, a systems table can be initialized with values and can be further configured based on a next processing stage using a trigger table to determine particular entries for each systems entry (e.g., array values) in the systems table, such as further described below at 606.

In an example implementation, the systems table (e.g., or another type of a data structure) can be initialized with entries for each system to be emulated in the honey network, including a translated IP address for each system and a set of system attributes (e.g., which can be initialized and/or populated with relevant data based on the parsing of the network scan survey). Each system identified in the network scan survey generally includes an associated IP address (e.g., a static or dynamically assigned IP address). The translation engine can be configured to translate the IP address of each system to a different IP address to be used for emulated versions of each system in the honey network (e.g., an $IP_x$ value from the network scan survey can be mapped to a new $IP_y$ value for the honey network configuration). In some cases, a different IP subnet can be used for the honey network, and the IP address can be translated to unique IP addresses within that IP subnet. The network scan survey can also include various other attributes associated with each system detected and reported in the network scan survey. For example, a system fingerprint can report an OS and version for a given system (e.g., Debian Version 7, Microsoft Windows Server 2012 R2, or other operating systems and versions can be fingerprinted in the network scan survey and translated into the systems table for each detected system that had a fingerprinted OS and version, using various system OS/version fingerprint techniques performed by the network scanning tool used to generate the network scan survey). The translation engine can include the OS and version information in the entry for that particular system. As mentioned above, certain data may not yet be available from the network scan survey for a given system, in which case, the systems table can be initialized with default or other values that can be later updated or populated with data, such as the next processing stage, such as further described below at 606.

In an example implementation, the services table (e.g., or another type of a data structure) can be generated with entries for each service to be emulated in the honey network, including the translated IP address for each service in which the IP address has been translated to a new IP address in the honey network IP address space as similarly described above (e.g., an $IP_x$ value from the network scan survey can be mapped to a new $IP_y$ value for the honey network configuration). For each system identified in the network scan survey, any open ports with active services can also generally be detected and reported in the network scan survey (e.g., (port) scanning results can report, for example, an IP address, a port number for an open port of a system, and service for that open port, using various service fingerprint techniques performed by the network scanning tool used to generate the network scan survey). In one implementation, a key for each service can then be generated as follows: perform an IP address left shift operation (e.g., $IP_y<<16$, which is an operation for shifting the $IP_y$ value to the left by 16 bits to provide for 32 bits of IP address) plus the port number (e.g., the port number extracted from the network scan survey for that service). The respective keys can be used in the services table for each entry for each service that is included in the services table. This technique for using such keys for entries in the services table can avoid collisions for different services entries in the services table. The keys can also be used for implementing efficient searches (e.g., using b-tree searches, etc.) of the services table. As would now be apparent to one of ordinary skill in the art, other techniques can be used to generate key values for services for generating and searching the services table.

For example, the services table can be generated to include an entry for each port that was detected and reported in the network scan survey as being an open port of a given system and for which a service was fingerprinted for that open port. Thus, the services table provides a representation of (active/available) services detected and reported on in the network scan survey. As an example, a services table can include entries, such as $key_0$ [Apache, v6, (response data), (port)], $key_1$ [Telnetd, v2, (port)], etc.

In one embodiment, the services table can be generated to associate an IP address in the honey network with a virtual port and virtual service in the honey network based on a services fingerprint (e.g., a services prediction based on the fingerprint detected using the selected network scanning tool) reported in the translated network scan survey. In some implementations, a system representation, such as a table or another data structure, is generated and a services representation is generated, such as a table or another data structure, to efficiently associate certain attributes on a per system basis and to associate other attributes on a per service basis. In another implementation, a single or integrated data structure or other data representation can be used to store such systems and services related data translated from the network scan survey. For example, a database can be used to store such systems and services related data translated from translated network scan survey(s) (e.g., for one or more honey network configurations).

At 606, determining a set of attributes associated with each of the devices and/or services is performed. In an example implementation, a honey network generation engine of the cloud security service can determine a set of attributes associated with each of the devices and/or services using, for example, a trigger table, such as described above. An example honey network generation engine can be implemented in a programming language, such as Python, Java, or another programming language, which can be compiled and executed on a computing device as similarly described above with respect to FIG. 4.

In one embodiment, the systems representation is generated from a translation of the network scan survey as discussed above with respect to 604. In an example implementation, the systems representation is implemented as a systems table that includes an entry (e.g., an array or other data structure) for each device, denoted by its translated IP address, such as $IP_y$, including the fingerprinted OS and version, which was detected and reported in the translated network scan survey. In some cases, the array for a given device—$IP_y$, is initialized with default values for its associated OS related parameter entries (e.g., default TTL value, ARP response, ICMP ECHO denial, and/or other OS attributes that can be configured using default values based on documented OS attributes for a given OS/version, etc.). Then, using a trigger table, such as described above (e.g., in some cases, a particular trigger table can be selected for this operation based on the particular network scanning tool and version used to generate the network scan survey that was translated in the previous stage, or the particular trigger table can be selected based on the latest release of the network scanning tool, such as using the trigger table that corresponds to the latest release of Nmap or another network scanning tool), a lookup can be performed to determine if any of these default values should be configured/set to different values for each system represented in the systems table. In some cases, there can be a single default or there can be a plurality of different defaults based on a device type (e.g., a server versus a printer, etc.). In some cases, there can be a randomizer that can select a random set of default values to make a virtual system environment configuration of a honey network more unique and, thus, likely more challenging for an attacker to discover that they are in a virtual/honey network as opposed to a physical, actual network that has actual, physical systems with active services.

At 608, determining a set of responses to provide for each of the devices and/or services in response to a network scan is performed. In an example implementation, a honey network generation engine of the cloud security service can determine the set of responses to provide for each of the devices and/or services in response to a network scan for each of the systems and services (e.g., represented in the systems table and services table as described above) using a trigger table. For example, the trigger table can be a table or other data representation/structure that indicates appropriate or expected responses for each system (e.g., device and OS/version) and each service for a given probe sent from a network scanning tool (e.g., Nmap or another network scanning tool), such as similarly described above.

In one embodiment, whether an OS fingerprint for a device is based on certain OS specific parameters is determined (e.g., TTL value, ARP response, ICMP ECHO denial, and/or other OS attributes) using the translated network scan survey and/or the trigger table. If so, then the honey network generation engine can configure the entry in the system table for that device to indicate that such are the respective responses that are to be sent in response to appropriate probes from a selected network scan tool.

For example, the honey network generation engine can generate the honey network configuration for each of the systems in the systems table (e.g., which indicates a device and associated attributes) using the trigger table, which indicates appropriate or expected responses for each system (e.g., for each device type and OS/version) for a given probe sent from a particular network scanning tool (e.g., Nmap or another network scanning tool) to a targeted system. Also, the honey network generation engine can generate the honey network configuration for each of the services in the services table (e.g., which indicates a service for an open port of a system) using the trigger table, which indicates appropriate or expected responses for each service for a given probe sent from a network scanning tool (e.g., Nmap or another network scanning tool) to a targeted port of a targeted system. Thus, the honey network generation engine can generate the honey network configuration for each of the systems in the systems table and for each of the services in the services table to facilitate an implementation of the honey network configuration that will be capable of providing appropriate/ expected responses to probes from a network scanning tool for each of the emulated/virtual systems and services of the honey network. As a result, network scans by an attacker or other unauthorized user of any such systems and services of the honey network would be interpreted by the network scanning tool as corresponding to such systems and services (e.g., the probe responses would be fingerprinted as corresponding to the desired system or desired service). As such, the attacker or other unauthorized user would not be able to detect that the targeted system or targeted service are emulated systems or emulated services of the honey network.

At 610, generating a honey network configuration to emulate the target network is performed. In an example implementation, a honey network generation engine of the cloud security service can generate the honey network configuration to emulate the target network based on the systems representation and services representation generated using the translated network scan survey and trigger table input, such as described above.

Once the honey network configuration for emulating the target network is generated, the honey network can be implemented using a virtual machine environment as further described below with respect to FIG. 7.

Figure 7:
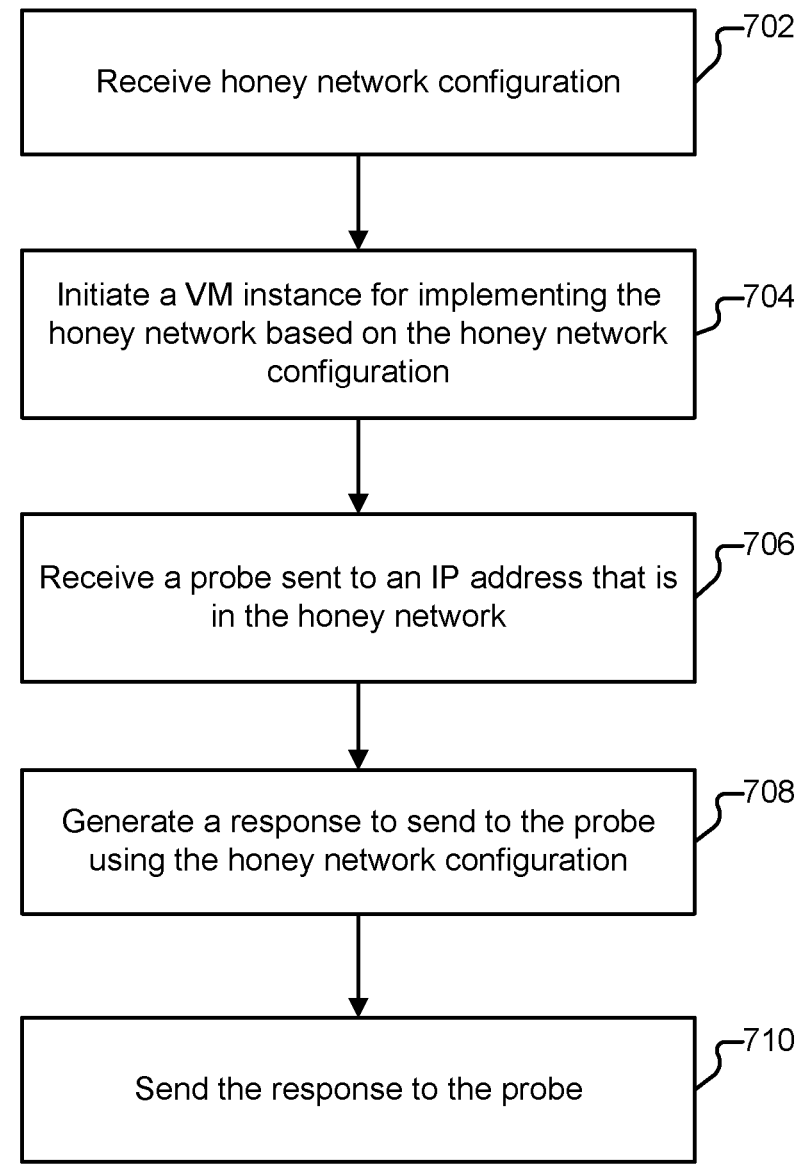
FIG. 7 is a flow diagram illustrating a process for responding to network scans from an unauthorized user implemented using a honey network configuration that emulates a target network environment in accordance with some embodiments.

Example Process for Responding to Network Scans from an Unauthorized User Implemented Using a Honey Network Configuration That Emulates a Target Network Environment FIG. 7 is a flow diagram illustrating a process for responding to network scans from an unauthorized user implemented using a honey network configuration that emulates a target network environment in accordance with some embodiments. In one embodiment, process 700 is performed by malware analysis system 232. In one embodiment, process 700 is performed by cloud security service 222. The process begins at 702 when a honey network configuration (e.g., the honey network configuration can be generated using the various techniques disclosed herein, such as described above with respect to process 600) is received. As one example, the honey network configuration can correspond to a subset or all of the target network that is to be emulated by the honey network. As another example, the honey network configuration can correspond to a randomized configuration that is based in part on a subset or all of the target network that is to be emulated by the honey network, such as described above.

At 704, a virtual machine (VM) instance for implementing the honey network based on the honey network configuration is initiated. For example, the VM instance can be initiated and executed using VM server 512 of malware analysis system 232 (e.g., HoneyNet VM-1 514) or VM server 524 of cloud security service 222 (e.g., HoneyNet VM-1 526). The honey network VM instance is configured for sending and receiving network traffic. Specifically, a raw socket for the VM instance can be opened to receive any packets that are directed to an IP address associated with an emulated system or emulated service in the honey network. As described above, if the VM instance is initiated and executed using VM server 524 of cloud security service 222, then a (secure) protocol tunnel can also be established for routing traffic directed to the honey network of enterprise 210 to cloud security service 222 for processing and responding to any probe packets directed to systems and/or services of the honey network (e.g., HoneyNet VM-1 526). As also described above, enterprise network 210 can be configured with a new IP subnet that corresponds to the IP address space of the honey network.

At 706, a probe is received at the VM instance that is emulating systems and services of the honey network. For example, a probe is sent from an attacker using a network scan tool to target a particular IP address of a system or service of enterprise network 210. If the targeted IP address is an IP address that corresponds to an emulated system/ service of the honey network, then the probe (e.g., packets associated with that probe) will be routed to the VM instance that is emulating systems and services of the honey network (e.g., HoneyNet VM-1 514 or 526). For example, network packets directed to IP addresses in the honey network of the enterprise network 210 can be sent to the honey network that is executed in a VM environment on a computing device of the cloud security service (e.g., HoneyNet VM-1 526). In an example implementation, an IPSEC tunnel can be configured to connect a data appliance (e.g., firewall/router device) of the enterprise network with the computing device providing the VM environment executing the honey network VM instance of the cloud security service. As such, probes directed to any IP addresses in the honey network can be routed to the VM environment executing the honey network VM instance of the cloud security service. Similarly, responses to such probes from the honey network responses can be routed back over the IPSEC back to the data appliance (e.g., firewall/router device) of the enterprise network such that such responses can then be sent back to the sender (e.g., the device used by the attacker to send the probe using the network scanning tool, which may be internal or external to the enterprise network targeted by the attacker). Such routing can be configured on the data appliances using IP-based rules to route such traffic to the honey network (e.g., implementing layer-3 destination IP-based rules, in which IP addresses in the honey network IP address range/subnet would be routed to the VM environment executing the honey network VM instance of the cloud security service). As discussed above, this honey network IP address space/subnet is an IP address range associated with the targeted enterprise network that an attacker can discover using various scanning techniques (e.g., routers on the enterprise network would generally be configured to include this honey network subnet), but legitimate services/users would generally not attempt to probe or otherwise communicate with this honey network subnet. As also discussed above, the VM environment executing the honey network VM instance can be implemented on a computing device that is local to the enterprise network (e.g., managed by a cloud security service provider and/or by a network/security admin of the enterprise network).

At 708, a response to send to the probe is generated using the honey network configuration. For example, the honey network VM instance can process the probe and automatically generate an appropriate/expected response to the probe using the honey network configuration. As similarly described above with respect to FIG. 6, the honey network configuration can include a systems data representation and a services data representation that includes data for responding to probes from a network scanning tool for each emulated system and emulated service of the honey network. Specifically, such responses are generated to result in appropriate fingerprints for each emulated system/service of the honey network tool as would be detected and reported using a network scanning tool (e.g., Nmap or another network scanning tool used by an attacker to probe the honey network).

At 710, the response to the probe is sent. For example, the honey network VM instance can send the response to the probe. As discussed above, such responses can be routed back to the sender of the probe.

As described above, all network traffic activity to and from the honey network VM instance can be logged. For example, the VM environment used for executing the honey network VM instance can be instrumented to capture all network traffic in a network traffic log. The network traffic log can be used to facilitate identification of attacker or other unauthorized user interactions with the honey network, which can facilitate identification of network intrusions and other attacker or unauthorized activities targeting the enterprise network (e.g., in this case, the honey network that emulates the target enterprise network). As an example, a report can be generated that includes logged network intrusions based on date/time, targeted systems and/or targeted services, source of the probes, and/or other criteria that can be captured by logging such network activities of interactions with the honey network using the instrumented VM environment.

An example implementation for receiving probes, generating responses to the probes, and sending the responses to probes directed to the honey network is further described below. Generally, receiving probes includes processing incoming network traffic directed to IP addresses in the honey network (e.g., including parsing incoming packets to determine a type of each incoming packet, such as protocol type). In one implementation, one or more threads for performing packet processing can be initiated in the honey network VM instance. For example, separate queues can be used for queuing different types of packets (e.g., based on a protocol of the network traffic), and separate threads can be used for performing packet processing for each of these separate queues, such as further described below. As an example implementation, a set of queues can include four primary queues for packet processing, in which each of the four primary queues handles a different type of packet that is received at the honey network VM instance (e.g., a TCP queue for the Transmission Control Protocol (TCP), a UDP queue for the User Datagram Protocol (UDP), an ICMP queue for the Internet Control Message Protocol (ICMP), and an IP queue for the Internet Protocol (IP)). In some cases, the honey network VM instance is implemented to facilitate low interactions (e.g., receiving, processing, and responding to probe packets in a manner that is sufficient to provide responses that would provide matches (fingerprints) for systems and services represented in the honey network configuration, whereas medium interaction may not be supported in this example implementation, to provide for a more lightweight implementation of the honey network VM instance). In some implementations, the honey network VM instance is implemented to facilitate low interactions and, in some cases, can also support medium interactions for one or more of the systems and/or services represented in the honey network configuration (e.g., in which medium interaction generally includes handling protocol traffic properly to encourage more attacker interaction with such systems and/or services represented in the honey network that are implemented to support medium interaction).

An example implementation for processing packets in a TCP queue is now generally described. When a packet is received that is destined for a TCP port, then an initial packet handler moves the TCP packet into the TCP queue. A TCP queue thread determines a type of the TCP packet (e.g., to determine whether the TCP packet is a SYN packet, an ACL packet, a RST packet, and/or another TCP packet type as defined in the standard TCP protocol). If the packet is a SYN packet, then a lookup operation is performed on a services table for the honey network configuration (e.g., as similarly described above) to determine whether the service exists in the services table (e.g., to determine whether the TCP service is active/exists for the destination port number of the destination IP address in the honey network configuration as represented in the services table). In one implementation, a class function can be implemented for responding, which is generated using a trigger table (e.g., as similarly described above) to populate the class function to know how to respond (e.g., a class function can be provided to respond per service (type) and per system (type)). If the service does exist, then a SYN ACK packet is generated and sent in response to acknowledge that the service is alive (e.g., and to keep trying to connect to the service). If the service does not exist, then a lookup operation is performed on a systems table for the honey network configuration (e.g., as similarly described above) to determine whether the system responds with a TCP reset (RST) packet. If so (i.e., the system responds with a TCP RST packet), then a SYN RESET packet is generated and sent in response. If not (i.e., the system does not respond with a TCP RST packet), then no response is generated and nothing is sent in response (e.g., silent/no response is sent in this case). If the packet is an ACK packet, then data is being sent (e.g., data is being pushed to the target destination in the honey network). The ACK packet can be verified to be valid based on a lookup operation that is performed on a systems table for the honey network configuration. If the ACK packet is valid, then such data can be passed to the services table, and an appropriate response can be generated and sent using the class function to respond as similarly described above.

An example implementation for processing packets in the UDP queue is now generally described. When a packet is received that is destined for a UDP port, then an initial packet handler moves the UDP packet into the UDP queue. A UDP queue thread processes the UDP packet. For example, as similarly described above in the TCP queue thread processing context, a lookup operation is performed on a services table for the honey network configuration (e.g., as similarly described above) to determine whether the service exists in the services table (e.g., to determine whether the UDP service is active/exists for the destination port number of the destination IP address in the honey network configuration as represented in the services table). In one implementation, as similarly described above in the TCP queue thread processing context, a class function can be implemented for responding or determining to not send a response, which is generated using a trigger table (e.g., as similarly described above) to populate the class function to know how to respond (e.g., a class function can be provided to respond per service (type) and per system (type)).

An example implementation for processing packets in the ICMP queue is now generally described. ICMP is a standard protocol that is commonly used by network devices, such as routers, to send error messages to indicate, for example, that a device (e.g., host or router) cannot be reached or that a requested service is not available. When an ICMP packet is received, then an initial packet handler moves the ICMP packet into the ICMP queue. An ICMP queue thread processes the ICMP packet. For example, if the packet is an ICMP echo request, then a lookup operation is performed on a system table for the honey network configuration (e.g., as similarly described above) to determine whether the IP address exists in the systems table (e.g., to determine whether the IP address exists in the honey network configuration as represented in the systems table). If so (i.e., the IP exists in the honey network configuration as represented in the systems table), then, as similarly described above in the TCP queue thread processing context, a class function can be implemented for generating and sending an ICMP echo request response. If not (i.e., the IP does not exist in the honey network configuration as represented in the systems table), then the class function can be implemented to determine whether the network response would provide a response or not regarding the non-existence of that IP address.

As would now be apparent to one of ordinary skill in the art, various other types of packets can be processed to generate and send appropriate responses based on the generated honey network configuration using the above-described techniques. For example, additional types of packets for each of these protocols can be supported and/or other protocols can be supported to facilitate interactions (e.g., light interactions) for implementing the honey network configuration using a VM instance executed in a VM environment to support responses to probes from various network scans so that an attacker would receive network scan survey results that indicate an existence of such emulated systems and services in the honey network.

Accordingly, the generation and emulation honey network techniques disclosed herein provide an efficient approach to implementing a honey network. For example, techniques allow for emulation of virtual devices in a honey network without requiring that the emulation perform a complete emulation of the emulated services and systems. As such, this approach also has a benefit of not causing undesired problems if legitimate services attempt to interact with any emulated systems and services of the honey network. The honey network does however provide appropriate system and service responses to network scans (e.g., by providing expected responses to probes from an Nmap scan or another scanning tool, to generate desired fingerprints for any such emulated services and systems in the honey network) that are sent from an attacker or other unauthorized user.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a hardware processor configured to:
receive a network scan survey of a target network;
generate a honey network configuration to emulate the target network using the network scan survey of the target network, wherein generating the honey network configuration includes generating a trigger table based on the honey network configuration for emulating at least a subset of the target network;
execute the honey network using the honey network configuration, wherein executing the honey network using the honey network configuration includes determining a set of responses for each of a plurality of devices on the target network and each service in response to probes received from a scanning tool using the trigger table, wherein the trigger table includes a set of data that indicates responses used by the scanning tool to identify a device type, an operating system (OS) type and OS version, and a service provided by a device;
receive a probe from the scanning tool sent to an IP address that is in the honey network;
generate a response to the probe using the trigger table based on the honey network configuration; and
send the response to the scanning tool, wherein the scanning tool is unable to detect that the response is associated with an emulated device and/or an emulated service in the honey network; and
a memory coupled to the processor and configured to provide the processor with instructions.

2. The system recited in claim 1, wherein the trigger table is provided for the scanning tool, and another trigger table is provided for another scanning tool.

3. The system recited in claim 1, wherein the trigger table includes a plurality of systems tables and a plurality of services tables.

4. The system recited in claim 1, wherein the processor is further configured to:
translate the network scan survey into a representation of a plurality of devices and a plurality of services.

5. The system recited in claim 1, wherein the processor is further configured to:
translate the network scan survey into a representation of a plurality of devices and a plurality of services; and
determine a set of attributes associated with each of the devices and each of the services.

6. The system recited in claim 1, wherein the processor is further configured to:
initiate a virtual machine (VM) instance for implementing the honey network based on the honey network configuration.

7. The system recited in claim 1, wherein the processor is further configured to:
receive another probe sent to another IP address that is in the honey network; and
generate another response to the another probe using the trigger table of the honey network configuration.

8. A method, comprising:
receiving a network scan survey of a target network;
generating a honey network configuration to emulate the target network using the network scan survey of the target network, wherein generating the honey network configuration includes generating a trigger table based on the honey network configuration for emulating at least a subset of the target network;
executing the honey network on a hardware processor using the honey network configuration, wherein executing the honey network using the honey network configuration includes determining a set of responses for each of a plurality of devices on the target network and each service in response to probes received from a scanning tool using the trigger table, wherein the trigger table includes a set of data that indicates responses used by the scanning tool to identify a device type, an operating system (OS) type and OS version, and a service provided by a device;
receiving a probe from the scanning tool sent to an IP address that is in the honey network;
generating a response to the probe using the trigger table based on the honey network configuration; and
sending the response to the scanning tool, wherein the scanning tool is unable to detect that the response is associated with an emulated device and/or an emulated service in the honey network.

9. The method of claim 8, wherein the trigger table is provided for the scanning tool, and another trigger table is provided for another scanning tool.

10. The method of claim 8, wherein the trigger table includes a plurality of systems tables and a plurality of services tables.

11. The method of claim 8, further comprising:
translating the network scan survey into a representation of a plurality of devices and a plurality of services.

12. The method of claim 8, further comprising:
translating the network scan survey into a representation of a plurality of devices and a plurality of services; and
determining a set of attributes associated with each of the devices and each of the services.

13. The method of claim 8, further comprising:
initiating a virtual machine (VM) instance for implementing the honey network based on the honey network configuration.

14. The method of claim 8, further comprising:
receiving another probe sent to another IP address that is in the honey network; and
generating another response to the another probe using the trigger table of the honey network configuration.

15. A computer program product, the computer program product being embodied in a non-transitory tangible computer readable storage medium and comprising computer instructions for:
receiving a network scan survey of a target network;
generating a honey network configuration to emulate the target network using the network scan survey of the target network, wherein generating the honey network configuration includes generating a trigger table based on the honey network configuration for emulating at least a subset of the target network;
executing the honey network using the honey network configuration, wherein executing the honey network using the honey network configuration includes determining a set of responses for each of a plurality of devices on the target network and each service in response to probes received from a scanning tool using the trigger table, wherein the trigger table includes a set of data that indicates responses used by the scanning tool to identify a device type, an operating system (OS) type and OS version, and a service provided by a device;
receiving a probe from the scanning tool sent to an IP address that is in the honey network;
generating a response to the probe using the trigger table based on the honey network configuration; and
sending the response to the scanning tool, wherein the scanning tool is unable to detect that the response is associated with an emulated device and/or an emulated service in the honey network.

16. The computer program product recited in claim 15, wherein the trigger table is provided for the scanning tool, and another trigger table is provided for another scanning tool.

17. The computer program product recited in claim 15, wherein the trigger table includes a plurality of systems tables and a plurality of services tables.

18. The computer program product recited in claim 15, further comprising computer instructions for:
translating the network scan survey into a representation of a plurality of devices and a plurality of services.

19. The computer program product recited in claim 15, further comprising computer instructions for:
translating the network scan survey into a representation of a plurality of devices and a plurality of services; and
determining a set of attributes associated with each of the devices and each of the services.

20. The computer program product recited in claim 15, further comprising computer instructions for:
initiating a virtual machine (VM) instance for implementing the honey network based on the honey network configuration.

21. The computer program product recited in claim 15, further comprising computer instructions for:
receiving another probe sent to another IP address that is in the honey network; and
generating another response to the another probe using the trigger table of the honey network configuration.

* * * * *